T. FREDERICK.
SUGAR DISPENSING DEVICE.
APPLICATION FILED SEPT. 19, 1918.

1,296,788.

Patented Mar. 11, 1919.

Witnesses
W. C. Fielding.
H. B. Vrooman.

Inventor
Theodore Frederick
By Richard Oliver
Attorney

UNITED STATES PATENT OFFICE.

THEODORE FREDERICK, OF HAMMOND, INDIANA.

SUGAR-DISPENSING DEVICE.

1,296,788.　　　　Specification of Letters Patent.　　Patented Mar. 11, 1919.

Application filed September 19, 1918.　Serial No. 254,799.

*To all whom it may concern:*

Be it known that I, THEODORE FREDERICK, a citizen of the United States, residing at Hammond, in the county of Lake and State of Indiana, have invented certain new and useful Improvements in Sugar-Dispensing Devices, of which the following is a specification.

This invention is a sugar dispensing device and consists in important improvements in devices of like nature.

One object of this invention is the production of a sugar dispensing device which is connected to a cabinet containing a quantity of sugar, thus permitting the device to be actuated to dispense predetermined amounts of sugar.

Another object of this invention is the production of a sugar dispensing device which is constructed so as to dispense predetermined amounts of sugar from the nozzle leading therefrom, whereby a receiving receptacle may be placed adjacent the end of the nozzle to receive the sugar dispensed therefrom.

Another object of this invention is the production of a sugar dispensing device which is connected to a containing cabinet, thus allowing the device to be particularly useful in lunchrooms and other places where the patrons sweeten their own beverages and foods, thus preventing wasting or spilling of the sugar, as only a predetermined amount is discharged from the nozzle.

Another object of this invention is the production of a sugar dispensing device wherein the dispensing tube receives the sugar from the cabinet and when turned will direct the sugar into the nozzle, while a follower is movably mounted within this tube for reducing the receiving space within this tube when desired.

One practical form of construction and assembly of the present invention will be hereinafter described and is illustrated in the drawing, in which—

Figure 1:
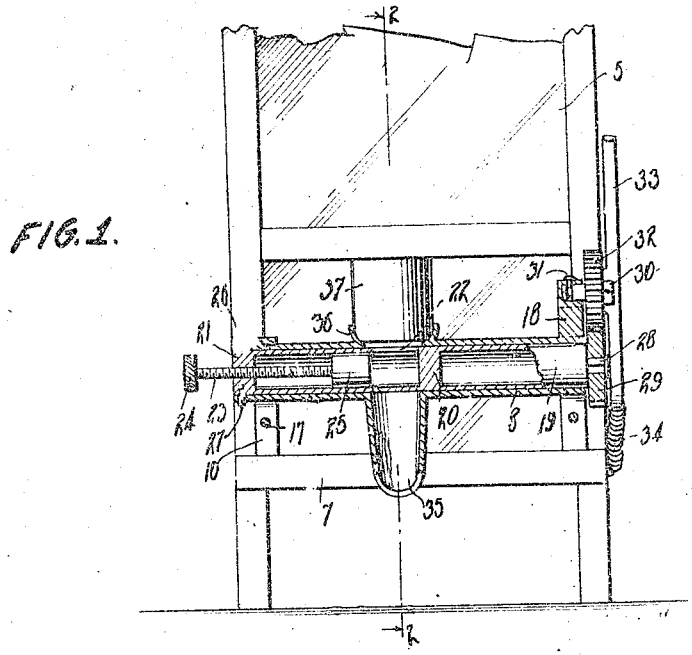
Figure 1 is a sectional view through the dispensing device, illustrating the same connected to a cabinet which is shown in fragmentary elevation, portions of the dispensing device being shown in elevation.

In the preferred embodiment of the present invention, about to be described, it will be seen that 5 indicates a containing cabinet having a slanting bottom 6, thus causing the sugar carried within the cabinet to be directed down toward one end thereof. This cabinet 5 is provided with a supporting shelf 7 upon its forward portions, as will be hereinafter explained, which is connected to the frame-work 5 of the cabinet.

A cylindrical casing 8 is positioned exteriorly of the cabinet and above the shelf 7, as shown in the drawing and is supported by a pair of brackets. One bracket comprises a circular body 9 fitting about one end of the casing 8 and has parallel standards 10 terminating in oppositely extending feet which are retained by the securing elements 12 upon the shelf 7.

The other bracket comprises a circular body 13 fitting upon the opposite end portion of the cylindrical casing 8 and has standards 14 extending downwardly therefrom and terminating in oppositely bent feet 15 secured by the elements 16 upon the shelf 7. It will be noted that the standards 10 and 14 of the two brackets are urged toward each other by bolts 17, whereby the circular bodies 9 and 13 will be firmly clamped upon the casing 8. It will be noted that the circular body 13 of the last mentioned bracket has a solid projection 18 extending thereabove for a considerable distance, as shown in Fig. 1 and indicated in dotted lines in Fig. 2.

A cylindrical dispensing tube 19 freely rotatable within the casing has an internal wall 20 adjacent its central portion, as shown in Fig. 1 and is also provided with a wall 21 at its end. An opening 22 is formed in the dispensing tube 19 and communicates with one side surface of the internal wall 20.

A threaded stem 23 extends through the end wall 21 of the dispensing tube 19 and projects into the tube and beyond the outer end of the tube. A milled head 24 is fixed upon the outer end of the stem 23 and when the head 24 is rotated the stem will pass through the end wall 21. The cylindrical follower 25 is connected to the inner end of the stem 23 and for this reason as the stem passes through the end wall 21, this follower 25 will be moved either away from or toward the internal wall 20 of the dispensing tube 19. Therefore, the receiving space within the tube adjacent one side of the internal wall 20 may be increased or diminished according to the movement of the follower 25.

Figure 3:
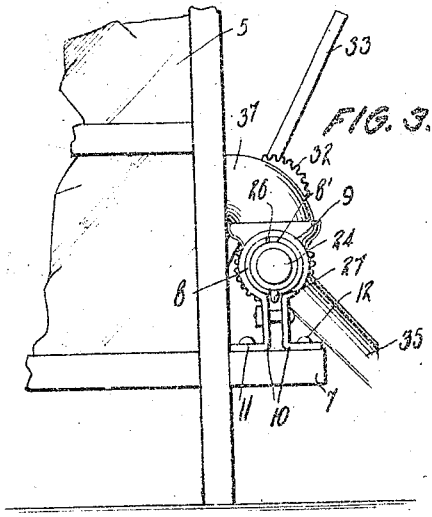
Fig. 3 is a side elevation of the dispensing device.

The casing 8 has a cut-away portion at its end thus forming abutment shoulders 26. A pin 27 is carried by the end wall of the dispensing tube 19 and moves within the cut-away portion of the casing 8 and engages the abutment shoulders 26. It is therefore obvious that rotary movement of the dispensing tube 19 in either of two directions will be limited by the pin 27 engaging a shoulder 26, as shown in Figs. 1 and 3. A squared shaft 28 extends from the opposite end of the dispensing tube 19 and has a pinion 29 mounted thereon. A headed stub shaft 30 has an end extending into the projection 18 of the body 13 of the second mentioned bracket and this headed stub shaft 30 is held against displacement by the pin 31, as shown in Fig. 1, engaging the stub shaft 30. The pinion 32 is carried upon the headed stub shaft 30 and meshes with the pinion 29. The operating handle 33 is fixed in any desired manner upon the pinion 32 and is normally urged in one direction by the coil spring 34 connected thereto and also secured to the cabinet 5.

Figure 2:
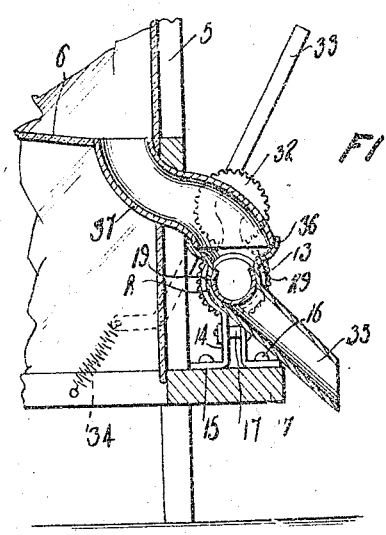
Fig. 2 is a sectional view taken on the line 2—2 of Fig. 1.

A spout 35 is fixed upon the cylindrical casing 8 intermediate its ends and this spout slants downwardly and away from the casing 8 to allow free access to the end thereof, as shown in the several figures of the drawing. It will also be noted that a hopper 36 is formed upon the upper portion of the cylindrical casing 8 and has a conduit 37 connected thereto as shown in Figs. 1 and 2. This conduit 37 is curved so as to extend inwardly from the dispensing device and then upwardly to communicate with the lower end of the bottom 6 of the cabinet 5.

As the bottom 6 slants downwardly, it is obvious sugar carried within the cabinet will run down into the conduit 37 and pass into the hopper 36 of the sugar dispensing device. Under normal conditions, the opening 22 of the dispensing tube 19 is arranged so as to allow the sugar passing into the hopper to flow into the interior of the dispensing tube between the internal wall 20 and the follower 25. When a customer desires a portion of sugar, a cup or a dish of food to be sweetened may be placed at the end of the nozzle 35. The handle 33 is gripped and pulled downwardly against the tension of the coiled spring 34, whereby the pinions 32 and 29 will be rotated. As the pinion 29 is rotated, rotary motion will be imparted through the shaft 28 to the dispensing tube 19. Thus the opening 22 will be moved out of registry with the hopper 36 and a further passing of sugar thereinto is cut off. Continued rotary movement of the dispensing tube causes the opening 22 thereof to be alined with the nozzle 35 and the sugar will flow from the interior of the dispensing tube through the nozzle 35 into the receiving dish at the end of this nozzle.

As before explained, the oscillating movement of the dispensing tube is limited by the pin 27 engaging the opposite shoulder 26 to that which it normally engages and for this reason the opening in the dispensing tube will be caused to accurately aline itself with the nozzle 35. As soon as the sugar has passed from the dispensing tube the handle 33 is released and the tension of the coil spring returns the handle to its normal position, thus imparting counter-rotary movement to the pinions and thus to the dispensing tube, thus returning the dispensing tube to its normal position. As soon as the opening 22 is alined with the nozzle 36, the portion of sugar passes into the tube for a subsequent operation.

Owing to the adjustable construction of the follower and the supporting stem, it is obvious that the quantity of the portions of sugar thus dispensed will be regulated by shifting of the follower 25 away from or toward the internal wall 20.

From the foregoing description it will be seen that the present device is especially useful where the patrons serve themselves with sugar. The present device prevents spilling of sugar and also prevents a wasting of sugar by an excessive quantity used at one time. Of course, the operator may shift the handle 33 as many times as desired to obtain a quantity of sugar, but the handle may be operated by an employee of the place using the device and thus an undue amount of sugar used is prevented. The device may also be used for filling the envelops of sugar ordinarily used in a great many lunchrooms in the conservation of sugar. It will thus be seen that a very efficient sugar dispensing device is provided which will quickly dispense the sugar from the tube when the handle 33 is actuated, although the tube will return to its normal position when the handle is released and the pin 27 will cause accurate registry with the opening in the tube either with the hopper or with the nozzle. Furthermore, the portions of sugar dispensed may be regulated by the movement of the follower as hereinbefore explained.

It is also obvious that if desired the spring actuated handle may be connected to the shaft of the dispensing tube, thus eliminating the gears, for the shifting of this handle will move the dispensing tube in the usual manner. Furthermore, instead of using a pinion 32 to actuate the pinion 29, a segmental rack may be employed upon the shaft and actuated by the handle and mesh with the pinion 29 for accomplishing the function of the two pinions without departing from the spirit of the invention.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and useful and desire to secure by Letters Patent is:—

1. In a sugar dispensing device, the combination with a cabinet, a conduit leading therefrom, a cylindrical casing crossing the lower end of the conduit, a hopper connecting these elements, and a spout leading downward from the casing in line with the hopper; of a cylindrical dispensing tube mounted for oscillation within said casing and having an opening substantially at its mid-length with a fixed wall at one side of the opening, a follower movably mounted at the other side of the opening, a screw through one end of the dispensing tube and connected to the follower for adjusting the position of the latter, and manually operable means for turning said dispensing tube, as described.

2. In a sugar dispensing device, the combination with a cabinet, a conduit leading therefrom, a cylindrical casing crossing the lower end of the conduit, a hopper connecting these elements, and a spout leading downward from the casing in line with the hopper; of a cylindrical dispensing tube mounted for oscillation within said casing and having an opening substantially at its mid-length with a fixed wall at one side of the opening, a follower movably mounted at the other side of the opening, a screw through this end of the dispensing tube and connected with said plunger for adjusting the same, a pinion fast to the other end of the dispensing tube, a second pinion meshing therewith and having an operating handle, and means for limiting the oscillation of said dispensing tube, as described.

3. In a sugar dispensing device, the combination with a cabinet having a shelf, a pair of brackets rising from the latter and each having a circular body at its upper end, a cylindrical casing mounted in said body and having spaced abutment shoulders at one end, a conduit leading from within the cabinet to a point over the mid-length of said casing, and a nozzle depending from the casing opposite said conduit; of an oscillating dispensing tube rotatably mounted within said casing and having an opening adapted to be turned into registry with the conduit or the spout, manually operable mechanism for turning the tube, and a pin on its wall movable between said shoulders on the casing for limiting the turning of the tube.

In testimony whereof I affix my signature in presence of two witnesses.

THEODORE FREDERICK.

Witnesses:
BOLESLAM SOLIK,
PAUL B. LIPINSKI.